(12) United States Patent
Calhoun et al.

(10) Patent No.: US 8,675,601 B2
(45) Date of Patent: Mar. 18, 2014

(54) GUEST ACCESS SUPPORT FOR WIRED AND WIRELESS CLIENTS IN DISTRIBUTED WIRELESS CONTROLLER SYSTEM

(75) Inventors: Patrice Calhoun, Pleasanton, CA (US); Abhijit Choudhury, Cupertino, CA (US); Rohit Suri, Fremont, CA (US); Sudhir Jain, Fremont, CA (US); Ranganatha Marathe, Santa Clara, CA (US); Bhanu Gopalasetty, San Jose, CA (US); Navindra Yadav, Cupertino, CA (US); Sreenivasulu Mondem, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 975 days.

(21) Appl. No.: 12/781,120

(22) Filed: May 17, 2010

(65) Prior Publication Data

US 2011/0280213 A1    Nov. 17, 2011

(51) Int. Cl.
*H04W 4/00* (2009.01)

(52) U.S. Cl.
USPC .......................................................... 370/331

(58) Field of Classification Search
USPC .............. 370/310, 310.2, 313, 315, 328, 329, 370/331, 338; 455/456.1, 437, 436, 442
See application file for complete search history.

(56) References Cited

U.S. PATENT DOCUMENTS

| | | | |
|---|---|---|---|
| 5,758,281 A | 5/1998 | Emery et al. | |
| 6,490,259 B1 | 12/2002 | Agrawal et al. | |
| 6,654,359 B1 | 11/2003 | La Porta et al. | |
| 6,961,774 B1 | 11/2005 | Shannon et al. | |
| 6,970,459 B1 | 11/2005 | Meier | |
| 7,061,896 B2 | 6/2006 | Jabbari et al. | |
| 7,596,376 B2 | 9/2009 | Calhoun et al. | |
| 7,639,648 B2 | 12/2009 | Nagarajan et al. | |
| 8,085,740 B2 * | 12/2011 | Zhang et al. | 370/338 |
| 2002/0085719 A1 | 7/2002 | Crosbie | |
| 2004/0221042 A1 | 11/2004 | Meier | |

(Continued)

FOREIGN PATENT DOCUMENTS

WO    2010053624 A1    5/2010

OTHER PUBLICATIONS

Johnson et al., "Mobility Support in IPv6", Network Working Group, RFC 3775, Jun. 2004, pp. 1-143.

(Continued)

*Primary Examiner* — Anh Ngoc Nguyen
(74) *Attorney, Agent, or Firm* — Edell, Shapiro & Finnan, LLC

(57) ABSTRACT

Techniques are provided to enable a support for guest access of devices in a network. At a controller apparatus in a first mobility sub-domain of a network comprising a plurality of mobility sub-domains, a request message containing a request for guest network access for a device is received from a first access switch in the first mobility sub-domain. The controller apparatus forwards the request message to a guest controller. At a tunneling endpoint apparatus in the first mobility sub-domain, a tunnel is established to the guest controller to carry traffic between the device and the guest controller. Traffic for the device passes in a tunnel between the first access switch and the tunneling endpoint apparatus in the first mobility sub-domain, through the tunneling endpoint apparatus in the first mobility sub-domain and in the tunnel between the routing apparatus in the first mobility sub-domain and the guest controller.

21 Claims, 9 Drawing Sheets

(56) References Cited

U.S. PATENT DOCUMENTS

| | | |
|---|---|---|
| 2004/0252653 A1 | 12/2004 | Shimizu et al. |
| 2005/0036471 A1 | 2/2005 | Singh et al. |
| 2005/0165953 A1 | 7/2005 | Oba et al. |
| 2006/0187878 A1 | 8/2006 | Calhoun et al. |
| 2006/0240825 A1 | 10/2006 | Funabiki et al. |
| 2006/0245393 A1 | 11/2006 | Bajic |
| 2006/0245404 A1* | 11/2006 | Bajic ............................ 370/338 |
| 2007/0070959 A1 | 3/2007 | Almeroth et al. |
| 2007/0140163 A1 | 6/2007 | Meier et al. |
| 2007/0147300 A1 | 6/2007 | Jee et al. |
| 2007/0160008 A1 | 7/2007 | Burgess |
| 2007/0160017 A1 | 7/2007 | Meier et al. |
| 2008/0002607 A1 | 1/2008 | Nagarajan et al. |
| 2008/0002642 A1 | 1/2008 | Borkar et al. |
| 2008/0043665 A1 | 2/2008 | Jeon et al. |
| 2008/0107070 A1 | 5/2008 | Sastry |
| 2008/0130598 A1 | 6/2008 | Kalhan |
| 2008/0175201 A1 | 7/2008 | Ahmavaara et al. |
| 2009/0059924 A1 | 3/2009 | Muramoto et al. |
| 2009/0093232 A1 | 4/2009 | Gupta et al. |
| 2009/0161590 A1 | 6/2009 | Lewis et al. |
| 2010/0172293 A1 | 7/2010 | Toth et al. |
| 2010/0232306 A1 | 9/2010 | Jeon et al. |
| 2010/0290398 A1 | 11/2010 | Choudhary et al. |
| 2011/0110294 A1* | 5/2011 | Valluri et al. ................. 370/328 |

OTHER PUBLICATIONS

Narten et al., "Neighbor Discovery for IP Version 6 (IPv6)", Network Working Group, RFC 4861, Sep. 2007, pp. 1-84.

Prommak C. et al., "Next Generation Wireless Lan System Design", Military Communications Conference, MICOM 2002, Proceedings, Anaheim, CA, Oct. 7-10 2002, NY, NY, US, vol. 1, Oct. 7, 2002, pp. 473-477.

International Search Report and Written Opinion in PCT/US2011/034883 dated Jul. 4, 2011.

* cited by examiner

US 8,675,601 B2

GUEST ACCESS SUPPORT FOR WIRED AND WIRELESS CLIENTS IN DISTRIBUTED WIRELESS CONTROLLER SYSTEM

RELATED APPLICATIONS

The present application is related to the following copending and commonly assigned U.S. patent applications:

U.S. patent application Ser. No. 12/773,360, entitled "Maintaining Point Of Presence At Tunneling Endpoint For Roaming Clients In Distributed Wireless Controller System."

U.S. patent application Ser. No. 12/773,355, entitled "Routing To The Access Layer To Support Mobility Of Internet Protocol Devices."

U.S. patent application Ser. No. 12/773,351, entitled "Maintaining Point of Presence at Access Switch for Roaming Clients in Distributed Wireless Controller System."

TECHNICAL FIELD

The present disclosure relates to networking techniques capable of supporting mobility of a network device.

BACKGROUND

Networked services to wired and wireless devices are supported by equipment that makes up what may be referred to as the "infrastructure" of the network. Examples of equipment in the network infrastructure include routers, access switches and control computers or servers that are used to store data pertaining to the status of devices that connect to the network. Some access switches have routing capabilities and in this regard are also referred to as "forwarders" because they forward packets from one access switch to another.

A device with networking capability, referred to herein as a "client device" or "station", may connect to the network at one access switch and then physically move, i.e., roam, such that it connects to a different access switch in the network. This roaming capability is prevalent with client devices that have wireless capabilities and can connect to a wired network at a different access switch by establishing a wireless connection, such as a wireless local area network (WLAN) connection with a wireless access point (AP) device.

A device that is not permanently authorized to operate in the network is sometimes given limited access to the network. This is called "guest" access and occurs when, for example, a person is visiting a large enterprise network and needs to have access to the enterprise network for purposes working with other individuals in the network. However, that access is limited only to certain data maintained by certain servers on the network called a "demilitarized zone" (DMZ), whereas other areas of the network are strictly prohibited to that guest user. In current network schemes, wired guest access and wireless guest access work differently. Wired guest access involves use of virtual local area networks (VLANs) and virtual routing and forwarding (VRF), while wireless guest access uses a tunneling architecture to tunnel guest traffic to the guest controller in the DMZ.

DESCRIPTION OF EXAMPLE EMBODIMENTS

Overview

Techniques are provided to enable a support for guest access of devices in a network. At a controller apparatus in a first mobility sub-domain of a network comprising a plurality of mobility sub-domains, a request message containing a request for guest network access for a device is received from a first access switch in the first mobility sub-domain. The controller apparatus forwards the request message to a guest controller that is configured to support guest network access for devices that are not authorized for native access to the network. The controller apparatus receives a response message from the guest controller, the response message containing information to enable guest access for the device. At a tunneling endpoint apparatus in the first mobility sub-domain, a tunnel is established to the guest controller, in which tunnel traffic from the device is sent to the guest controller. As a result, traffic for the device passes in a tunnel between the first access switch and the tunneling endpoint apparatus in the first mobility sub-domain, through the tunneling endpoint apparatus in the first mobility sub-domain and in the tunnel between the tunneling endpoint apparatus in the first mobility sub-domain and the guest controller.

Example Embodiments

Figure 1:
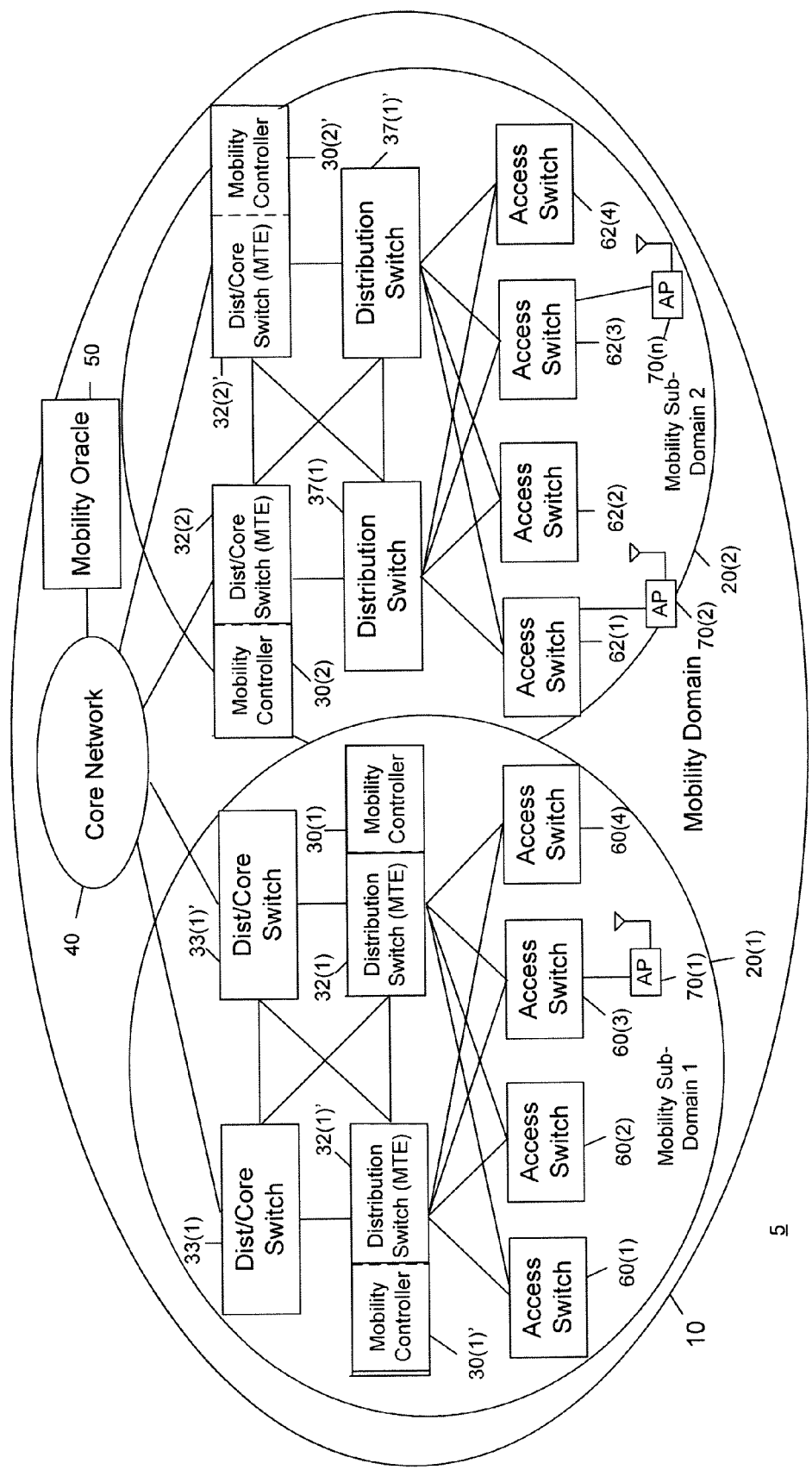
FIG. 1 is an example of a diagram of a network infrastructure architecture.

Reference is first made to FIG. 1. FIG. 1 illustrates a diagram depicting a network infrastructure architecture that is configured to support mobility of wired and wireless client devices. The network architecture 5 comprises a mobility domain shown at reference numeral 10. A mobility domain is a geographical region for which roaming services are to be provided. Contiguous coverage is intended to be provided in this geographical region by the network architecture 5. The network architecture 5 provides better scaling properties over existing systems in that it breaks down the traditional mobility group into multiple mobility sub-domains. Thus, a mobility domain includes one or more mobility sub-domains, also referred to herein as mobility sub-domains. For simplicity, FIG. 1 shows two sub-domains 20(1) and 20(2) and labeled Mobility Sub-Domain 1 and Mobility Sub-Domain 2, respectively. For instance, a mobility sub-domain could consist of a single building within a campus. A sub-domain is more of a representation of the network topology than the physical walls of a building, so it is also possible for a sub-domain to span multiple buildings in a campus, for example.

The network architecture 5 further comprises a mobility controller and a mobility oracle. In one form, each mobility sub-domain includes one or more mobility controllers (MCs) and mobility tunnel endpoint (MTE) pairs. While more than a single MC-MTE pair may be present in a sub-domain, only one may be active at any given time. The presence of multiple pairs in a sub-domain is for resilience and failure back up. In another form, a single MC is provided for the entire mobility domain.

FIG. 1 shows that in mobility sub-domain 20(1) there is a mobility controller 30(1) paired with an MTE 32(1) and a backup mobility controller 30(1)' paired with a backup MTE 32(1)'. Similarly, in mobility sub-domain 20(2) there is a mobility controller 30(2) paired with an MTE 32(2) and a backup mobility controller 30(2)' paired with a backup MTE 32(2)'. The MTE is a tunneling endpoint apparatus and its functions are described further hereinafter.

In the example architecture shown in FIG. 1, the functions of the MTEs in each sub-domain may be incorporated or integrated with other network equipment. For example, in sub-domain 20(1), the MTEs 32(1) and 32(1)' may be incorporated into a distribution switch and further connected to distribution/core switches 33(1) and 33(1)', respectively. The distribution/core switches 33(1) and 33(1)' are in turn connected to a core network 40 that represents a Layer 3 or "core" portion of the network architecture 5. In mobility sub-domain 20(2), the MTEs 32(2) and 32(2)' may be integrated into respective distribution/core switches that are in turn connected to the core network 40. In this case, there are distribution switches 37(1) and 37(1)' connected to MTEs 32(2) and 32(2)' in sub-domain 20(2).

A mobility controller provides the mobility control plane operations, facilitating handoff events that occur both within a mobility sub-domain, as well as across sub-domains. To this end, an entity called the mobility oracle 50 is provided. The mobility oracle 50 is a centralized database that includes information on each of the client devices in the network, their home mobility sub-domain and the current foreign sub-domain providing service. The mobility oracle 50 is consulted by the individual mobility controllers in order to facilitate inter sub-domain mobility events. The mobility oracle 50 is shown coupled to the core network 40, but it may also be connected at the sub-domain level to any of the mobility sub-domains. As with the mobility sub-domain's mobility controller, more than one mobility oracle may be deployed for redundancy purposes, although only one would be active at any given time for the mobility domain.

Within each mobility sub-domain are access switches that provide the access layer connectivity to client devices operating in the mobility domain 10. For example, mobility sub-domain 20(1) has access switches 60(1)-60(4) and mobility sub-domain 20(2) has access switches 62(1)-62(4). Each access switch is capable of serving one or more IP subnets. An IP subnet comprises a plurality of IP addresses. An access switch assigns an IP address to a client device when it is determined that the client device is connected to the network for the first time. It is also possible that two or more access switches may serve the same IP subnet(s). Access switches within a mobility sub-domain may be grouped together in what is referred to herein as switch groups or peer groups. A switch peer group is statically configured by the MC, based on static information or information that is dynamically learned. Within a switch peer group, every switch has to have the same view of the membership of the group. A switch peer group does not span mobility sub-domains or routing boundaries. A mobility sub-domain may have one or more switch peer groups.

As explained hereinafter, client devices associate to an access switch, either by a wired network connection, or a wireless network connection (through a wireless access point device). FIG. 1 shows wireless access point (AP) devices at reference numerals 70(1)-70(n). The AP devices support the Control and Provisioning of Wireless Access Points (CAPWAP) protocol. As the CAPWAP architecture specifies, the APs perform the physical (PHY) layer and real-time IEEE 802.11 MAC functions, which includes IEEE 802.11 encryption. The AP establishes a tunnel to the access switch to tunnel client devices' wireless traffic.

The APs encrypt all CAPWAP control traffic using the Datagram Transport Layer Security (DTLS) protocol. If the AP supports Cisco TrustSec (CTS) or IEEE 802.1AE (MacSec) encryption, then a link between the switch and the AP may be protected by Layer 2 CTS, in which case both CAPWAP control messages and CAPWAP traffic will get encrypted. If CTS is not supported, then the CAPWAP data traffic is unencrypted. In one possible form, CAPWAP data traffic can also be DTLS encrypted as an option.

Each MTE provides mobility services on the data plane, ensuring that a client device's point of presence on the Layer 3 network remains constant across mobility events. An MTE's involvement in a routing scenario for a client device is optional in that the functions of the MTE are only utilized when tunneling is employed.

FIG. 1 shows the MTE function as being located in either the distribution or the distribution/core switch. The location of the MTE is shown in this way purely for illustrative purposes as it could reside in any number of devices, integrated in switches/routers or in stand-alone appliances. The actual embodiment of the MTE may depend upon the switches, routers and appliances supporting a tunneling process described herein. The MTE can have two different roles depending on the availability of the subnets for the roamed client device at the MTE. If the subnet of the roamed client device is available at the MTE, the MTE could become the point of presence; otherwise the MTE functions as a tunnel switching entity that connects the roamed client device to the point of presence, which could be an access switch. As described further hereinafter in connection with FIG. 9, the MTE may be integrated in a border router in each sub-domain. In this example, the MTEs may be integrated with border or edge routers of their respective sub-domain.

FIG. 1 shows the MCs and the MTEs as co-located entities. Again, the MC handles the mobility control logic, while the MTE provides the data plane operations. The MC and MTE functions may be encompassed in a single physical entity. When integrated in a single entity or unit, the MC configures its data plane, the MTE function, through a set of application programming interfaces (APIs) or commands. Thus, in the MC/MTE single unit integrated configuration, the MTE is the data path of the MC. However, when the MC and MTE functions are embodied in separate entities, some additional signaling for the commands is necessary between the MC and the MTE. This would involve the MC forwarding portions of the signaling it had received from an access switch to configure the forwarding tables stored at the MTE. The separation of these functions makes it possible to deploy a network that does not make use of tunneling. Such a network would still require the mobility control plane, provided by the MC, but would not require the functions of the MTE.

Figure 2:
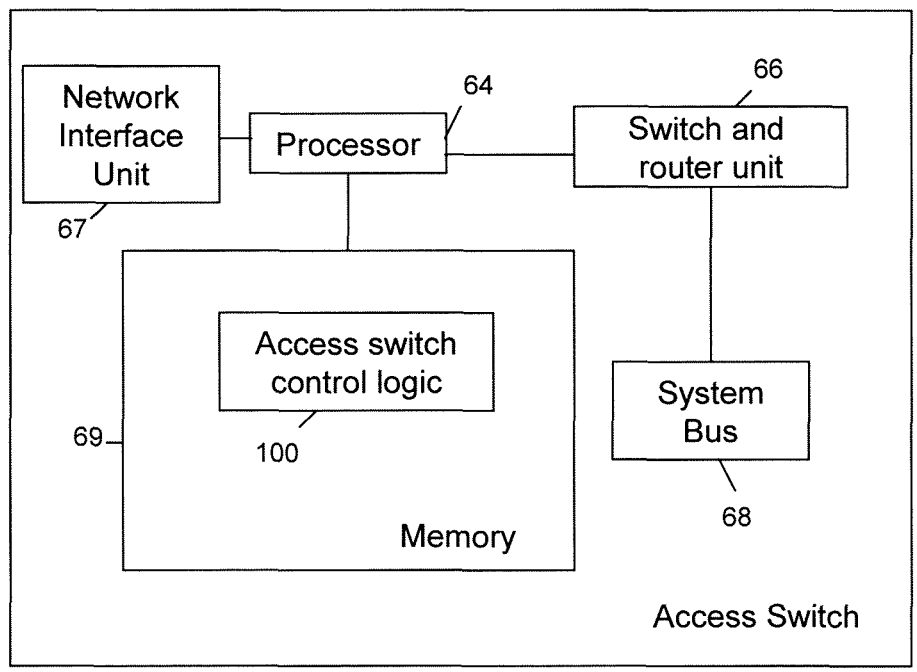
FIG. 2 is an example of a block diagram of an access switch that is part of the network infrastructure architecture shown in FIG. 1.

Reference is now made to FIG. 2 for a description of an example block diagram of an access switch. This diagram is meant to representative of a block diagram for any of the access switches 60(1)-60(4) and 62(1)-62(4) shown in FIG. 1, and in general for any access switch in any mobility sub-domain. The access switch comprises a processor 64, a switch and router unit 66 that may be in the form of an Application Specific Integrated Circuit (ASIC), a network interface unit 67, a system bus 68 and a memory 70. The switch and router unit 66 provides the packet forwarding (routing) and switching functions that are well known for a network access switch. The network interface unit 67 processes packets for transmission over the network and processes packets received from the network For example, the network interface unit 67 is an Ethernet card or similar device. The access switch is also referred to herein as a "forwarder" because it forwards packets to and from a client device. Instructions for access switch control logic 100 are stored in the memory 69 for execution by the processor 64.

The processor 64 may be a programmable processor or a fixed-logic processor. In the case of a programmable processor, the memory 69 is any type of tangible processor or computer readable memory (e.g., random access, read-only, etc.) that is encoded with or stores instructions that, when executed by the processor 64 or any computer or general data processor, cause the processor to perform a variety of functions including the functions of the access switch control logic 100 described herein. Alternatively, the processor 64 may a fixed-logic processing device, such as an ASIC or digital signal processor or a network processor or a general purpose processor that is configured with firmware comprised of instructions that cause the processor(s) 64 to perform the functions described herein. Thus, instructions for the logic 100 may take any of a variety of forms, so as to be encoded in one or more tangible media for execution, such as with fixed logic or programmable logic (e.g., software/computer instructions executed by a processor) and the processor(s) 64 may be a programmable processor, programmable digital logic (e.g., field programmable gate array) or an ASIC that comprises fixed digital logic, or a combination thereof.

Examples of functions of the access switch control logic 100 as they pertain to the guest services support functions for a client device are described hereinafter in connection with FIGS. 8-11. These functions include "mobility agent" functions and datapath functions. The mobility agent functions are responsible for handling mobility events on the access switch, configuring the datapath elements on the switch for mobility and communicating with the MC. The datapath functions include terminating the CAPWAP tunnels which encapsulate IEEE 802.11 traffic sourced by wireless client devices, allowing the access switch to treat wired and wireless traffic in a uniform fashion.

More specifically, the functions of the mobility agent in the access switch are as follows. The mobility agent is responsible for responding in a timely manner to mobility control protocol messages sent by the various entities in the network, ensuring that a roaming budget time period is maintained for client devices. If the wireless subnets are not available at the MC/MTE, then the mobility agent assumes the role of the point of presence for roamed client devices that were originally associated with it. When the network is configured in a Layer 2 mode, the mobility agent is responsible for advertising reachability for the client devices connected to it. If tunneling is employed, an Address Resolution Protocol (ARP) request would be transmitted on behalf of the client device through the tunnel, which the point of presence (MTE or access switch) would bridge onto its uplink interface. The mobility agent is responsible for subscribing to multicast groups on behalf of a client device after a roaming event has occurred. This information is passed as part of the context to the new access switch to ensure that the multicast flows follow the client device as it roams. When the access switch is connected to a Layer 3 access network, the mobility agent is responsible for injecting routes for the client devices that are associated with it for which tunneling is not provided. The mobility agent performs an 802.1X authenticator function for both wired and wireless client devices. Finally, when a station successfully authenticates to the network, the mobility agent forwards the Pairwise Master Key (PMK) to the MC, and the MC is responsible for flooding the PMK to all of the access switches in the mobility sub-domain.

Figure 3:
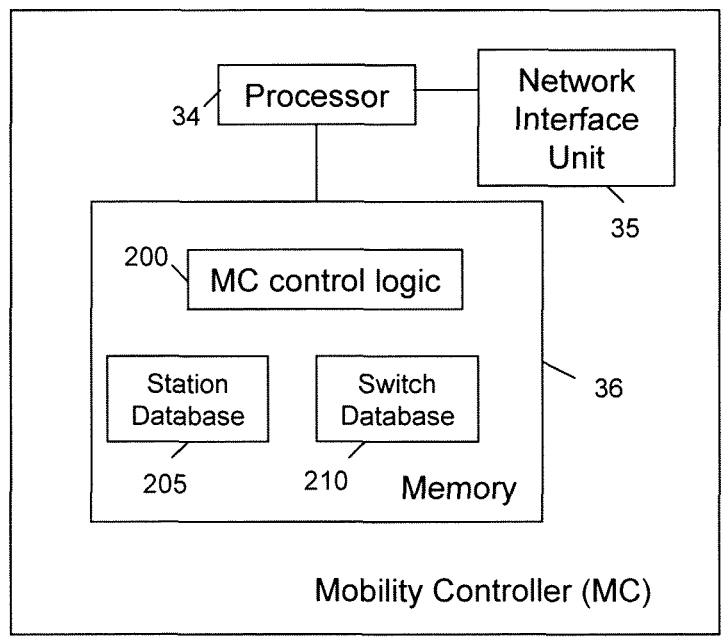
FIG. 3 is an example of a block diagram of mobility controller apparatus that is part of the network infrastructure architecture shown in FIG. 1.

Turning now to FIG. 3, an example block diagram of an MC is now described. An MC is a control apparatus that may be embodied by a computing apparatus comprising a processor 34, a network interface unit 35 and a memory 36. Examples of specific embodiments of the processor 34 and the network interface unit 35 are described above in connection with FIG. 2. The memory 36 stores MC control process logic that, when executed by the processor 34, cause the processor 34 to perform the MC functions described herein. In addition, the memory 36 stores a stations database 205 and a switch database 210.

The stations database 205 maintains a database of all client devices that are being provided service within the local sub-domain or the entire mobility domain (if the MC is configured to serve the entire mobility domain). This database may not store full client device context and may only include information indicating whether the client device currently considers the local sub-domain as its home, and is in many ways very similar to the function provided by the mobility oracle, although with a more limited scope, i.e., only for client devices local to the sub-domain. The database may include additional information such as the client device's credentials, which could be in the form of the user's identity, or a common name in a certificate, as well as the IP Address assigned to the device, if one has already been assigned to it by the network.

The switch database 210 maintains a database of all access switches within the mobility sub-domain, and updates all of the access switches, in real-time, as changes to the database occur (e.g., addition or removal of a switch from the network).

Other functions of the MC are summarized as follows. The MC is responsible for responding in a timely manner to mobility control protocol messages from other entities to ensure that the system achieves the desired roaming budget. The MC acts as a gateway between the access switches and the mobility oracle. When the MC does not find a match in its local database, it forwards the request to the mobility oracle, which is responsible for the entire mobility domain. However, there are deployment scenarios where the MC is responsible for the entire mobility domain. When tunneling is employed for a client device, its point of presence on the network could be the MTE if the wireless subnets are available at the MTE. Therefore, in these cases, the MC will respond to any ARP requests received for the client devices it is responsible for. When the MC is connected to a Layer 3 network, the it is responsible for injecting routes into the network for the client devices it provides service for via a tunnel. The MC is the control point for the access switches for all mobility management related requests. When a change in a client device's point of attachment occurs, the MC is responsible for configuring the proper forwarding policy on the MTE, which may be collocated with the MC. If the MC and the MTEs are physically separate, the MC is responsible for initiating the signaling to the MTE to enforce changes in the client device's point of attachment in the network. The MC is capable of handling unsolicited commands from the Remote Authentication Dial-in User Service (RADIUS) infrastructure. These messages can be received by an access switch and forwarded to the MC to clear out or update the client key cache entries. It is also the responsibility of the MC to forward these messages to other MCs in mobility domain if a message is received from access switch. The MC may optionally also act as an Network Time Server to the access switches to allow all access switches within a mobility sub-domain to have their clocks synchronized. The MC in turn synchronizes its clock off the mobility oracle.

Figure 4:
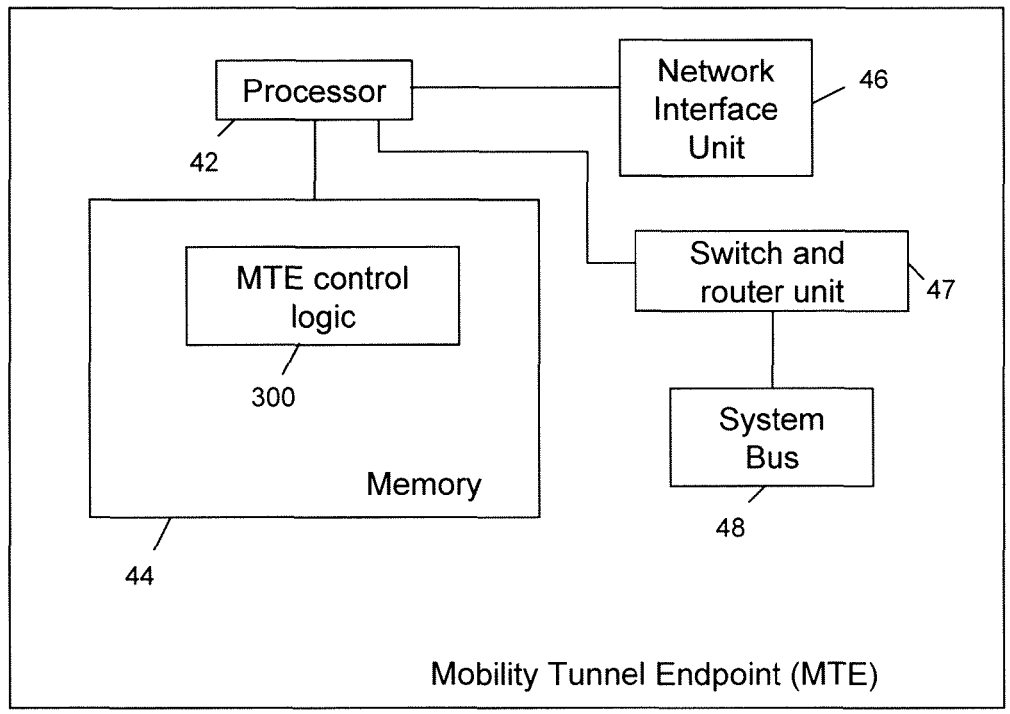
FIG. 4 is an example of a block diagram of a mobility tunnel endpoint (MTE) apparatus that is part of the network infrastructure architecture shown in FIG. 1.

Turning to FIG. 4, an example block diagram of an MTE is now described. The MTE is a computing apparatus that may also perform routing functions. The MTE comprises a processor 42, a memory 44 and a network interface unit 46. The MTE may be integrated into a distribution switch or router and to this end FIG. 4 shows basic switching components including a switch and router unit 47 and a system bus 48. Instructions are stored in the memory 44 for MTE control logic 300. The processor 42 executes the instructions for the MTE control logic 300 to perform the various MTE functions described herein.

The MTE handles the mobility data plane. The role of the MTE is different depending on whether or not it is serving as the point of presence for client devices in the sub-domain. If the wireless subnets are not available at the MTE, then the point of presence for roamed client devices is at the home access switch. In this scenario, the MTE serves as a tunnel switching entity that connects the foreign access switch (point of attachment) to another access switch (point of presence) that serves the IP subnet for the IP address of that device. If the wireless subnets are available at the MTE, then the MTE serves as the point of presence.

The functions of the MTE are generally as follows. The MTE terminates "mobility" tunnels from the access switches in its mobility sub-domain. Thus, there are pre-established tunnels between the MTE and each access switch in a given mobility sub-domain. Traffic to and from the roamed client device is sent to the foreign access switch via the mobility tunnel. An MTE-MTE tunnel is used to tunnel traffic between mobility sub-domains. The MTE has an interface the MC uses to configure the MTEs forwarding tables to reflect mobility events. When the MC and MTE are collocated, this is simply an API. If both functions are not collocated, this is a protocol.

As explained herein, the MC and MTE functions may be implemented by separate physical entities. In the case where they are implemented in a single entity, the MTE does not actually act as a router, and therefore does not inject routes into the network. The MC is responsible for advertising routes. However, the interfaces on which the routes are injected are considered part of the MTE. In the unlikely event that the MTE is decoupled from the MC, it is responsible for transmitting certain packets on behalf of the MC. For instance, the MC will provide Proxy ARP and routing services, yet these packets are transmitted on the MTEs interfaces. For networks that do not make use of tunneling, the MTE is not a necessary function.

Figure 5:
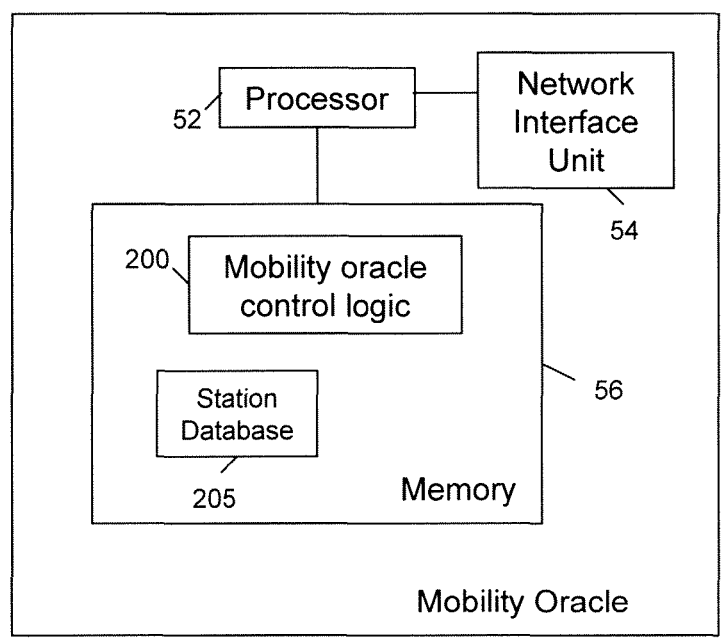
FIG. 5 is an example of a block diagram of a mobility oracle apparatus that is part of the network infrastructure architecture shown in FIG. 1.

Reference is now made to FIG. 5 for a description a block diagram of the mobility oracle 50. The mobility oracle 50 contains a centralized database that includes information on each of the client devices in the network, their home mobility sub-domain and the current foreign sub-domain providing service. The mobility oracle 50 is a computing apparatus with network connectivity that oversees the entire mobility domain, but it does not necessarily perform any routing or packet forwarding functions. The mobility oracle 50 comprises a processor 52, a network interface unit 54 to provide network connectivity with the MCs and MTEs in the mobility domain, and a memory 56 that stores mobility oracle control logic 400 and a station database 405. The station database 405 maintains a database of all stations that are being provided service within the mobility domain. This station database 405 is populated through interactions the mobility oracle has with all of the MCs in all of the mobility sub-domains it supports. The station database includes each station's MAC address, its current home mobility sub-domain, and if roaming, its current foreign mobility sub-domain. When the mobility oracle 50 receives a request from an MC, it is responsible for performing the station lookup, and forwarding the request to the proper MC. The mobility oracle 50 acts as an NTP server to the MCs to allow all of the controllers within the mobility domain to have their clocks synchronized. The functions of the mobility oracle control logic 400 as they pertain to the guest support services are described hereinafter in connection with FIGS. 8-11.

The following terms are defined for convenience in connection with the descriptions herein.

Foreign Mobility Controller: The MC providing mobility management service for the client device in a foreign mobility sub-domain. The foreign MC acts as a liaison between access switches in the foreign sub-domain and the MC in the home sub-domain.

Foreign Mobility Sub-Domain: The mobility sub-domain, controlled by an MC, supporting a client device whose IP address is part of an IP subnet which is served by an access switch in another mobility sub-domain.

Foreign Switch: The access switch in the foreign mobility sub-domain currently providing service to the client device.

Home Mobility Controller: The MC providing the single point of control and mobility management service for client devices in their home mobility sub-domain.

Home Mobility Sub-Domain: The mobility sub-domain, controlled by a MC, for a client device where its IP address was assigned.

Home Switch: The switch in the home mobility sub-domain that last provided service to a client device.

Mobility Domain: A collection of mobility sub-domains across which mobility needs to be supported.

Mobility Sub-Domain: The mobility sub-domain is an autonomous component of the overall mobility domain network. A sub-domain generally connects into the core network, and includes one or more MC functions, and optionally their associated MTEs. A mobility sub-domain is the set of devices managed by the active Mobility Controller. A mobility sub-domain comprises of a set of access switches, and associated APs, across which fast roaming is desired. A mobility sub-domain is equivalent to an 802.11r key domain. The mobility sub-domain may also be referred to as an IP Everywhere (IPe) sub-domain. A mobility sub-domain and an mobility sub-domain are terms that are used interchangeably herein.

Point of Attachment: A client device's point of attachment is where the client is currently associated to the wireless network. This could either be the access switch that is currently providing service to the AP where the client device is associated, or the WLAN controller in the case of a legacy deployment. Thus, a wireless client device may roam from one AP on a first access switch to another AP on a second access switch and thereby become "attached" at or on the second access switch.

Point of Presence: A client device's point of presence is the place in the network where the client device is being advertised. For instance, if a switch is advertising reachability to the client device via a routing protocol, the interface on which the route is being advertised is considered the client device's point of presence.

Station: A client device that connects to and requests service from the network. The device may have a wired, wireless or both interfaces. The term station may be used interchangeably with the term client device.

Figure 6:
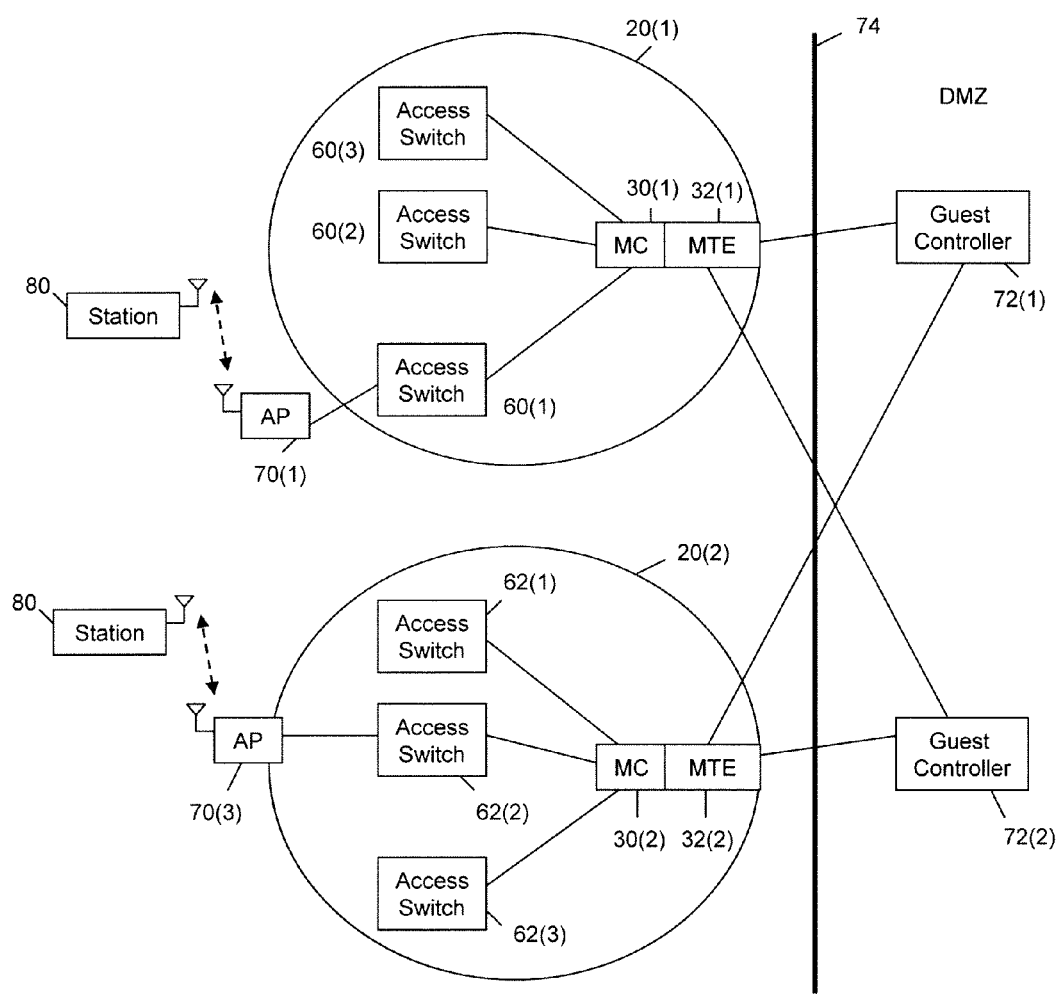
FIG. 6 is an example of a diagram showing part of the network infrastructure depicted in FIG. 1 and further illustrating guest controllers.

Referring now to FIG. 6, a block diagram is shown of a portion of the mobility domain shown in FIG. 1, and further illustrating guest controllers 72(1) and 72(2) that are logically located behind a firewall 74. More than two guest controllers may be provided but for simplicity, two are shown in FIG. 6 as an example. The guest controllers 72(1) and 72(2) are provided to manage support for devices that are to have network services in the mobility domain as so-called "guest" devices. A guest device or station is one that does not have the authority for native access to the network. For example, a person may visit an enterprise campus facility and wish to have network services and to be able to roam in the mobility domain. The guest controllers are provided to store and execute access policies on behalf of guest devices, whether the guest devices are wired or wired devices. The guest controllers 72(1) and 72(2) are standalone appliances that are located in a so-called "Demilitarized Zone" (DMZ) behind the firewall 74 and are configured to support guest network access for devices that are not authorized for native access to the network.

FIG. 6 illustrates an example where a station 80 that is seeking access to the network as a guest associates with AP 72(1) that is connected by a CAPWAP tunnel to an access switch 60(1) in a first mobility sub-domain 20(1). The MC/MTE 30(1)/32(1) in the first mobility sub-domain 20(1) establishes tunnels to each of the guest controllers 72(1) and 72(2) on behalf of a station as needed to support guest services for that station. Likewise, the MC/MTE 30(2)/32(2) in the second mobility sub-domain 20(2 establishes tunnels to each of the guest controllers 72(1) and 72(2) on behalf of a station as needed to support guest services for that station. The station 80 may roam to another access switch in mobility sub-domain 20(1) or to another access switch in the second mobility sub-domain 20(2). In this example, the station 80 is shown to roam to an AP 70(2) connected to an access switch 62(2) in the second mobility sub-domain 20(2).

Described hereinafter in connection with FIGS. 8-11 are examples of control signaling that occur to establish the necessary tunnels at the MTE in a sub-domain to support guest services to a station as that station roams in the mobility domain. The access switch builds a tunnel to the MC/MTE in its sub-domain and the MC/MTE builds a tunnel to the guest controller in the DMZ. The guest controller inspects the guest traffic and applies policies to it. Since a guest station authentication and security policies are done by the guest controller, the access switch has the following responsibilities. It identifies wired/wireless guest stations and traffic. It tunnels the guest traffic to the guest controller via the MC/MTE in its sub-domain. The advantage of this configuration is that a unified support solution is provided for wired and wireless stations. This technique is highly scalable because the tunnels are set up by the MC/MTE and the MC/MTE can distribute traffic across multiple guest controllers based on their respective guest traffic loads. The guest tunnels between the MTEs and the guest controllers may use the same format as the mobility tunnels between the MTEs and the access switches in the mobility sub-domains.

Figure 7:
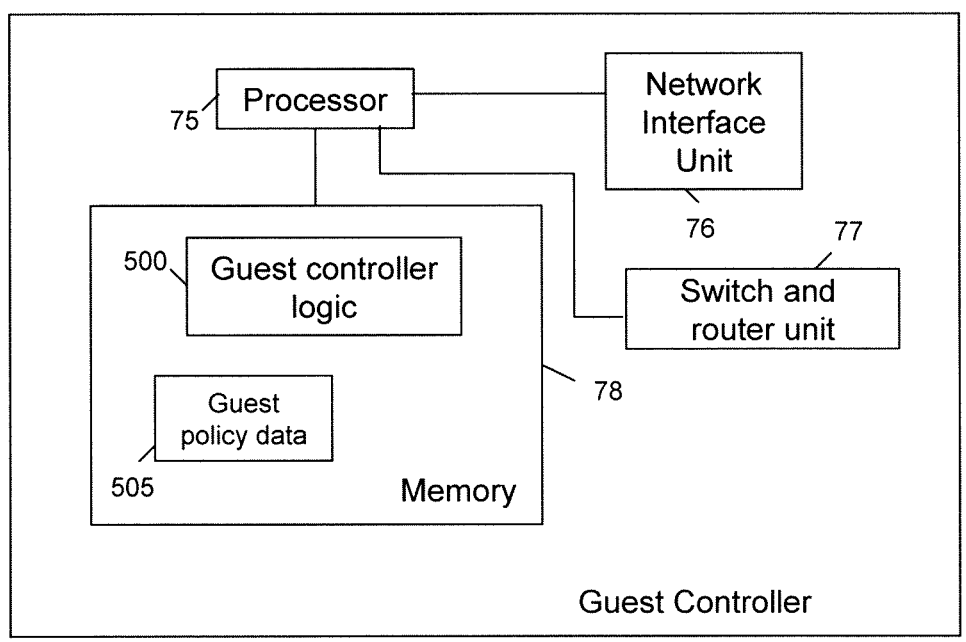
FIG. 7 is an example of a block diagram of a guest controller apparatus that is part of the network infrastructure shown in FIG. 6.

Turning now to FIG. 7, a block diagram of a guest controller is described. The guest controller comprises a processor 75, a network interface unit 76, a switch and router unit 77 (if the guest controller is to have packet forwarding capabilities) and a memory 78. The memory 78 stores guest controller logic 500 and a guest policy data 505. The operations of the guest controller logic 500 are described hereinafter in connection with FIGS. 8-11. There are several aspects to guest access support: security, management of guests and policy application to guest devices.

As explained herein, traffic is tunneled from MTEs to the guest controller in the DMZ and the guest controller serves as the anchor for the station. The guest controller logic 500 uses the guest policy data 50 to authenticate a guest station or a guest device can be allowed to pass traffic without any authentication. The guest controller logic 500 also applies security policies for guest traffic whereas service policies, such as Quality of Service (QoS) policies can be applied at point of attachment (e.g., Foreign controller). In other words, the guest controller logic 500 applies policies to support access to the network for devices that are not authorized for native network services in the network.

The guest controllers are configured on the MCs as mobility members like any other MC. Upon configuration of a guest controller, the MC starts a Keep Alive mechanism between it and the guest controllers to maintain reachability status. The access switch sends a list of guest controllers configured on the guest WLAN to the MC and the MC selects the guest controller with the least load. The guest controller supports both CAPWAP and Ethernet over IP (EOIP) tunnels. The guest controllers will send, in response to keep alive messages from the MC, status information indicating their current load conditions. This enables the MC to be aware of the relatively load conditions of the guest controllers so it can select a guest controller with relatively low load conditions at the time that the MC receives an Export Anchor Request message from an access switch.

FIGS. 8-11 illustrate control signaling flows for various guest service scenarios. In these figures, reference numerals in the 100's refer to operations of an access switch, reference numerals in the 200's refer to operations of MC, reference numerals in the 300's refer to operations of an MTE, reference numerals in the 400's refer to operations of the mobility oracle and reference numerals in the 500's refer to operations of a guest controller.

Figure 8:
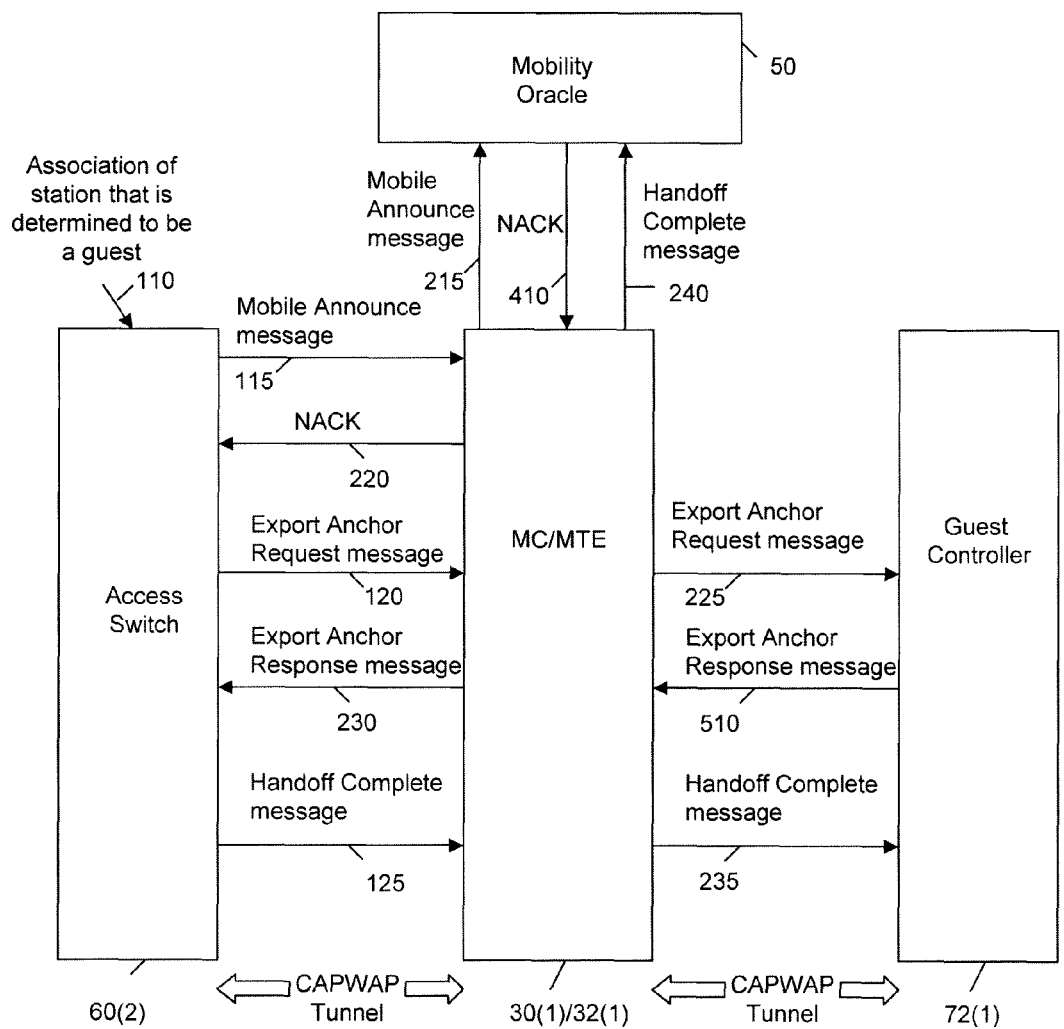
FIG. 8 is an example of a ladder flow diagram depicting control messages that are sent between equipment in the network infrastructure architecture showed in FIG. 7 when a client device seeking guest access associates to the network for the first time.

Reference is now made to FIG. 8 for a description of a scenario when a guest station associates with the network and guest services are established for the station by way of a guest controller in the DMZ. Reference is also made to FIG. 6 for the description of the control signal flow in FIG. 8. At 110, the access switch, e.g., access switch 60(1) in mobility sub-domain 20(1), upon detecting the station, completes Layer 2 authentication of the station, such as by Wi-Fi Protected Access (WPA) or WPA-shared authentication techniques. The access switch can distinguish wireless guest traffic from wired guest traffic based on a Guest Service Set Identifier (SSID) configuration, which is information that is associated only with wireless guest client devices. Next, at 115, the access switch generates a mobile announce message and sends it to the MC/MTE in its sub-domain in order to determine whether the station has previously associated at any other access switch in the mobility domain. In this example, it is assumed that this is the instance that the station has associated with any access switch in the mobility domain. At

215, the MC/MTE 30(1)/32(1) in sub-domain 20(1) sends the mobile announcement message to the mobility oracle 50. The mobility oracle 50 compares the MAC address of the station against its stored data (station database) and determines that the station has not previously associated with an access switch in the mobility domain. At 410, the mobility oracle sends a non-acknowledge (NACK) message to the since this is the initial association of the station. The MC/MTE 30(1)/32(1) sends the NACK to the access switch at 220. The Mobile Announce message is not necessary for wired stations.

At 120, the access switch sends an Export Anchor Request message to the MC/MTE 30(1)/32(1). The Export Anchor Request message is a message that contains client payload (IP address of the access switch where the station is associated and MAC address of the station) and guest profile information, and serves to request guest network access for the station. For a wireless station, the guest profile is a WLAN Service Set Identifier (SSID) and for a wired station the guest profile is information identifying guest privileges for the particular wired station. The guest controller uses the guest profile information to apply specific guest access policies. In addition, the Export Anchor Request message includes a list of guest controllers that are configured for guest support services.

Upon receiving the Export Anchor Request message, the MC 30(1) selects one of the guest controllers in the list based on load conditions that the MC is aware of from status messages received from the guest controllers. At 225, the MC 30(1) forwards Export Anchor Request message to the guest controller with the lowest load conditions, which in this example is guest controller 72(1). In another form, the MC 30(1) may select the guest controller to use in a round robin fashion among the multiple guest controllers identified in the Export Anchor Request message. When the guest controller receives the Export Anchor Request message, it creates a mobile entry and determines the guest policies configured for the WLAN from which the station associated and obtains an IP address for the station. If a Dynamic Host Configuration Protocol (DHCP) server is configured on the guest controller, then the DHCP server can assign the IP address, or a DHCP server is not configured on the guest controller, the guest controller communicates with an external DHCP server that allocates the IP address. The guest controller relays or bridges the DHCP packets to the wireless client. That is, the guest controller stores policies for different types of stations and based on the guest profile received in an Export Anchor Request, the guest controller applies those policies to the guest profile. Again, the SSID for a station may be used as guest profile and the guest controller maps that SSID to a corresponding guest policy. A guest policy may comprise information as to the access privileges granted to a guest station, bandwidth access conditions for the guest station, etc.) The guest controller sends an Export Anchor Response message at 510. The Export Anchor Response message comprises information to enable guest access for the device, i.e., client payload, anchor payload (containing guest controller MAC address and IP address obtained for the station by the guest controller) and status payload (success or failure). It is to be understood that Layer 3 authentication (Web authentication) is performed at the guest controller.

The MC receives the Export Anchor Response message and creates a client context or updates a client context entry, if one exists, for that station. The client context entry comprises all information about that station that was learned by the MC from the Export Anchor Request message and the Export Anchor Response message. The MC generates a command to configure the MTE 32(1) associated with the MC 30(1) to establish a CAPWAP tunnel to the guest controller 72(1) in which tunnel all traffic from the station to the guest controller 72(1). Thus, the MTE 32(1) associated with the MC 30(1) is controlled by the MC 30(1) to serve as a (border or edge) tunneling endpoint apparatus to tunnel all traffic from the guest station to the guest controller.

At 230, the MC 30(1) forwards the Export Anchor Response message to the access switch. When the access switches receives the Export Anchor Response message and determines that it contains a status "success", it then "plumbs rules to the fast path" to allocate the appropriate routing path to start CAPWAP tunneling traffic from the station to the guest controller 72(1) via the MTE 32(1). Otherwise, if the status payload of the Export Anchor Response message is "failure" then the access switch will de-authorize the station so that it can try to associate and seek guest support services at a later time.

Assuming the Export Anchor Response message contained a "success" status payload, then the access switch sends a Handoff Complete message to all switches in its switch group (as a broadcast message) and as a unicast message to the MC 30(1). The MC 30(1) in turn forwards the Handoff Complete message to the guest controller at 235 and to the mobility oracle at 240. The Handoff Complete message contains anchor payload (for peer group switches, other mobility controllers or the mobility oracle) and other information for the guest controller that notifies the guest controller to which MC/MTE to set up a tunnel and start tunneling traffic for the station. The guest controller, upon receiving this message, determines the sub-domain of the station where the station is located and configures the tunnel to point to the MTE of that sub-domain, e.g., MTE 32(1) for tunneling traffic to the station. Thus, traffic for the station is sent in a tunnel between the access switch 60(1) and the MTE 32(1) in the first mobility sub-domain mobility sub-domain, and in the tunnel between the MTE 32(1) in the mobility sub-domain and the guest controller 72(1). A similar process would be performed if the MC 30(1) selected the second guest controller 72(2) shown in FIG. 6.

The flow of FIG. 8 may be summarized as follows. At a controller apparatus in a first mobility sub-domain of a network comprising a plurality of mobility sub-domains, a request message containing a request for guest network access for a device is received from a first access switch in the first mobility sub-domain. The controller apparatus forwards the request message to a guest controller that is configured to support guest network access for devices that are not authorized for native access to the network. The controller apparatus receives a response message from the guest controller, the response message containing information to enable guest access for the device. At a tunneling endpoint apparatus in the first mobility sub-domain, a tunnel is established to the guest controller, in which tunnel traffic from the device is sent to the guest controller. As a result, traffic for the device passes in a tunnel between the first access switch and the tunneling endpoint apparatus in the first mobility sub-domain, through the tunneling endpoint in the first mobility sub-domain and in the tunnel between the tunneling endpoint apparatus in the first mobility sub-domain and the guest controller.

Figure 9:
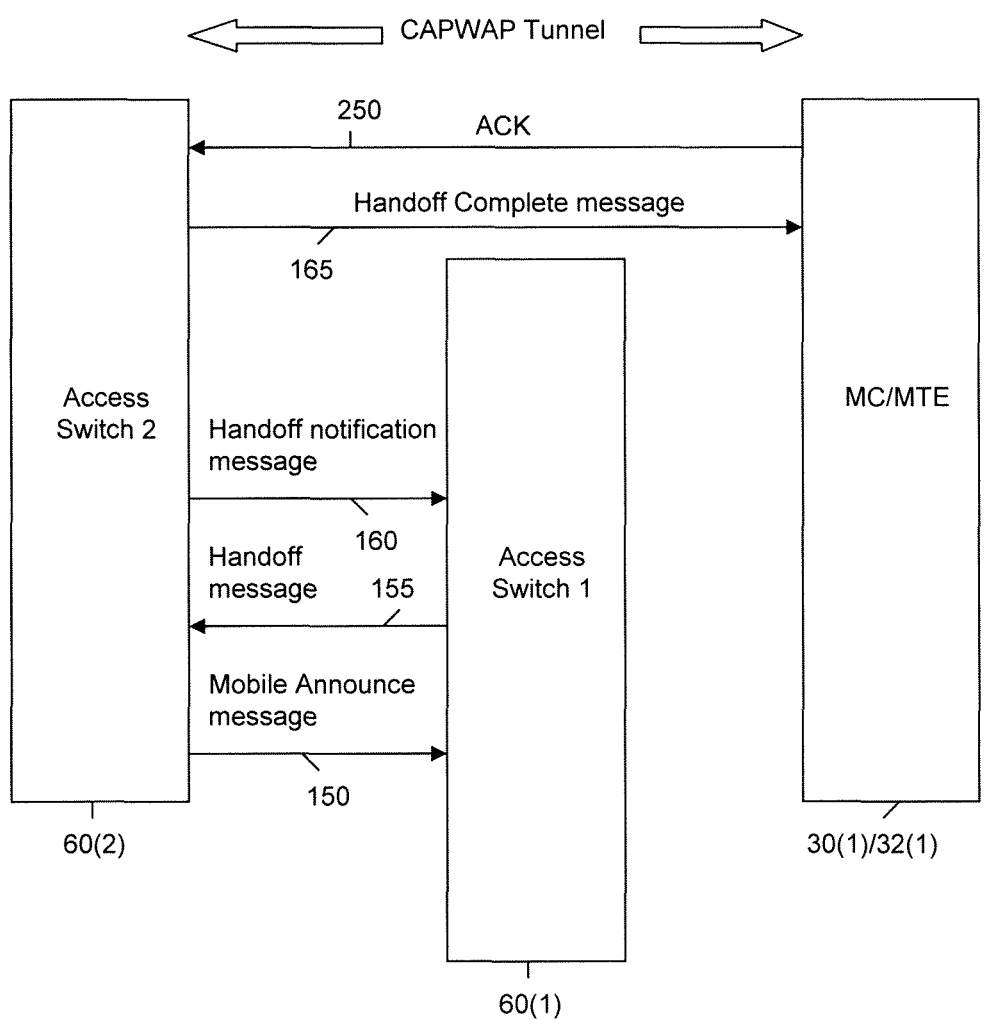
FIG. 9 is an example of a ladder flow diagram illustrating control messages that are sent between equipment when a guest client device roams between access switches in the same mobility sub-domain and within a switch peer group.

Turning to FIG. 9, a flow diagram for control signals exchanged when a guest station roams from one access switch to another access switch is now described. This diagram depicts the scenario where the point of attachment for the station is at a first access switch, e.g., 60(1), and the station roams to a second access switch 60(2) that is in the same switch group (and also within the same mobility sub-domain 20(1)) as the first access switch 60(1). At 150, upon the station associating with the second access switch 60(2), the second access switch 60(2) sends a unicast Mobile Announce message to the first access switch 60(1). The second access switch 60(2) knows that the station was previously anchored at the first access switch 60(1) from a previous Handoff Complete message received from the first access switch 20(1). At 155, the first access switch 60(1) sends a Handoff message to the second access switch 60(2). Normally, for a guest station the context information contained in the Handoff message (IP address assigned to the station, etc.) is not important. Sometimes, the context may include session keys or Authentication, Authorization, and Accounting (AAA) override parameters associated with policy parameters passed by a Remote Authentication Dial In User Service (RADIUS) server during an authentication stage. At 160, the second access switch sends a Handoff Notification message to the switches in the switch group of the first and second access switches (thus the first access switch receives this message as shown in FIG. 9) and at 165 sends a Handoff Complete message to the MC 30(1). Upon receiving the Handoff Notification message, the first access switch cleans up the context information for the station (deleting its association at the first access switch). Upon receiving the Handoff Complete message, the MC 30(1) configures the MTE 32(1) to tunnel traffic for the station to the second access switch (no longer to the first access switch) between it and the guest controller that was serving that station, e.g., guest controller 72(1) in the scenario depicted in FIG. 8. At 250, the MC 30(1) sends an ACK to the second access switch 60(2) confirming that it will tunnel traffic for that station to the second access switch 60(2).

Figure 10:
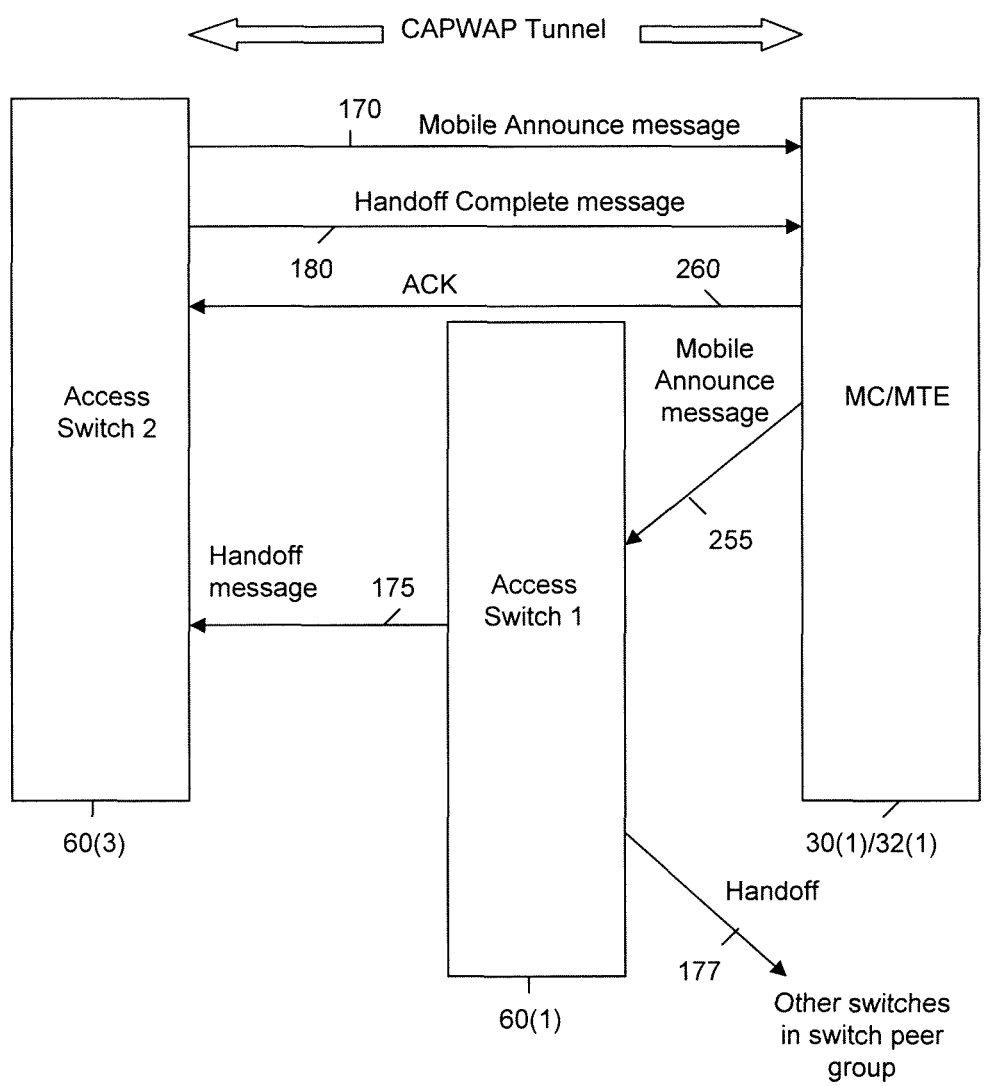
FIG. 10 is an example of a ladder flow diagram illustrating control messages that are sent between equipment when a guest client device roams between access switches in the same mobility sub-domain and across switch peer groups.

FIG. 10 illustrates a roaming scenario where the station roams to an access switch in the same mobility sub-domain but not outside of the switch group. Thus, the station roams to and associates with a third access switch 60(3) which is not in the same switch group as switch 60(1). At 170, access switch 60(3) sends a Mobile Announce message to the MC 30(1) indicating that the station has been detected at access switch 60(3). At 255, the MC 30(1) updates its station database on the basis of the Mobile Announce message and sends the Mobile Announce message to the first access switch 60(1). Upon receiving the Mobile Announce message, at 175 the first access switch 60(1) sends a Handoff message to the third access switch 60(3) and at 177 sends the Handoff message to other switches in the switch group of access switch 60(1) informing them that the station has left the switch group. The third access switch then sends a Handoff complete message to the MC 30(1), which in response configures the MTE 32(1) to tunnel traffic from the guest controller, e.g., guest controller 72(1), to the access switch 60(3) for the station. The MC 30(1) also sends an ACK to the third access switch at 260 to confirm to the access switch 60(3) that the MTE 32(1) will tunnel traffic to access switch 60(3) for the station.

FIGS. 9 and 10 are examples of scenarios where a guest station roams from one access switch to another access switch in the same mobility sub-domain. In either case, when the MC in that mobility sub-domain receives a Handoff Complete message indicating that the guest station has roamed from an initial (first) access switch to a second access switch, the MC configures its associated MTE to tunnel traffic for the device to the second access switch to which the guest station has roamed.

Figure 11:
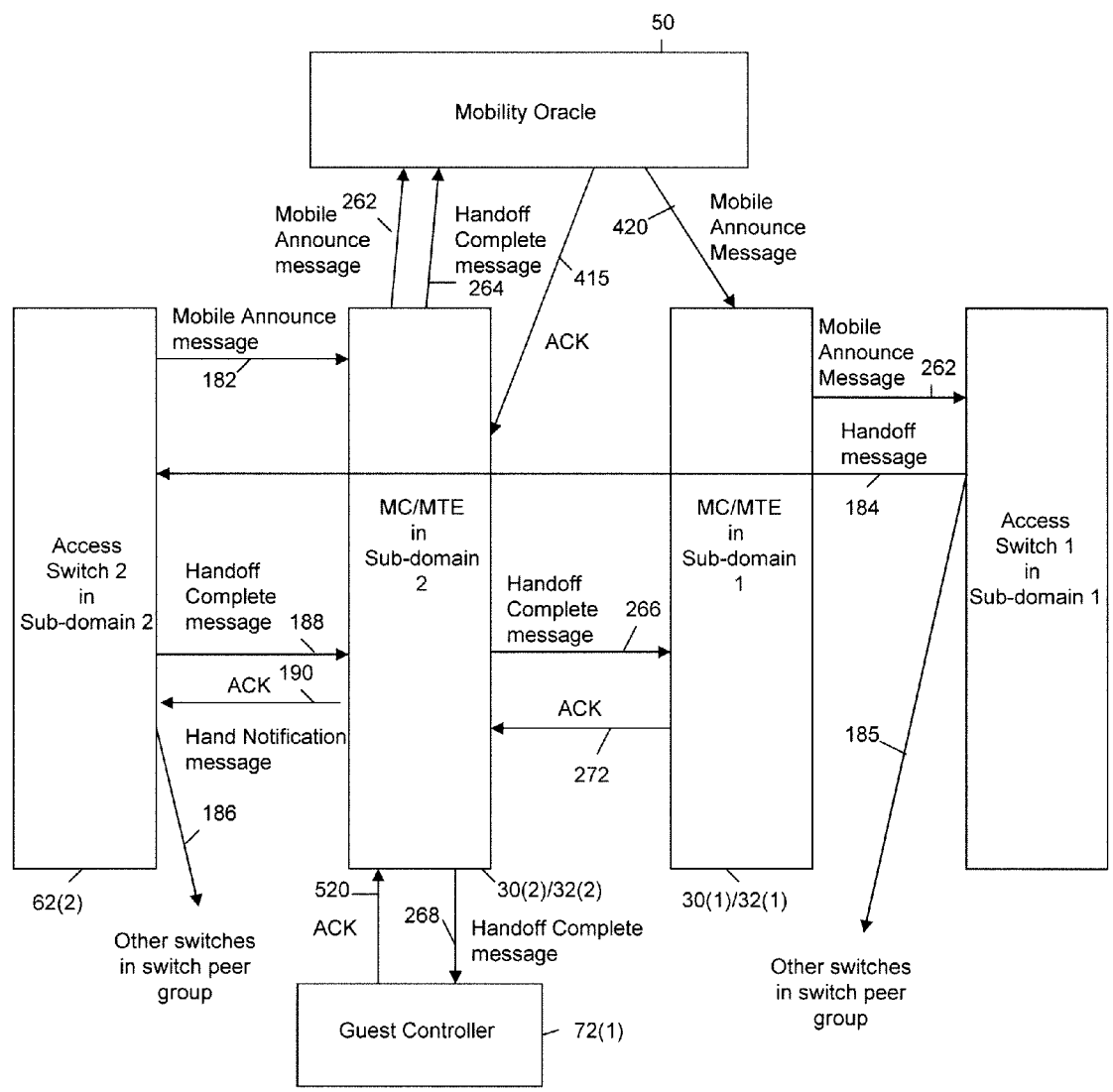
FIG. 11 is an example of a ladder flow diagram illustrating control messages that are sent between equipment when a guest client device roams between mobility sub-domains.

Turning now to FIG. 11 with reference to FIG. 6, a flow diagram is described for the scenario where the station roams from a first access switch in a first mobility sub-domain to a second access switch in a second mobility sub-domain. For example, the station 80 roams from the access switch 60(1) in the first mobility sub-domain 20(1) to the second access switch 62(2), via AP 70(3), in the second mobility sub-domain 20(2). When the station associates with access switch 62(2), at 182, the second access switch 62(2) in the second mobility sub-domain sends a Mobile Announce message to the MC 30(2) in the second sub-domain. At 262, the MC 30(2) sends the Mobile Announce message to the mobility oracle 50. The mobility oracle 50 compares the information contained in the Mobile Announce message against its station database and determines that the station had previously been associated with access switch 60(1) in the first mobility sub-domain. At 420, the mobility oracle sends the Mobile Announce message to the MC 30(1) in the first mobility sub-domain. At 262, the MC 30(1) sends the Mobile Announce message to the first access switch 60(1). The first access switch 60(1) then sends a Handoff message at 184 to the access switch 62(2) in the second mobility sub-domain. At 185, the access switch 60(1) sends the Handoff message to other switches in its switch group. At 186, the access switch 62(2) sends a Handoff Notification message to switches in the switch group of access switch 62(2) in the second mobility sub-domain, and at 188, sends a Handoff Complete message to the MC 30(2) in the second mobility sub-domain. The Handoff Complete message contains the IP address of the guest controller that is handling guest traffic for the station. The MC 30(2) sends an ACK at 190 At 264, the MC 30(2) sends a Handoff Complete message to the mobility oracle 50 (which updates its station database to indicate the new location of the station) and sends the Handoff Complete message at 266 to the MC 30(1) in the first mobility sub-domain. The mobility oracle 50 responds to the Handoff Complete message with an ACK at 415.

Recall from earlier descriptions that the MTE in each mobility sub-domain has pre-established CAPWAP tunnels with each access switch in its mobility sub-domain. Upon receiving the Handoff Complete message from the access switch 62(2), the MC 30(2) generates a command to configure the MTE 32(2) to tunnel traffic to the guest controller identified in the Handoff Complete message. Now that the MC 30(2) has information indicating the IP address of the guest controller responsible for the station, e.g., guest controller 72(1), the MC 30(2) sends a Handoff Complete message to the guest controller 72(1) at 268. Upon receiving the Handoff Complete message, the guest controller switches or points tunneling of traffic for the station from MTE 30(1) to MTE 30(2), and responds with an ACK message at 520 to confirm the change. The MC 30(1) responds with an ACK at 268 to confirm the change to the MC 30(2). Traffic from the guest station is sent in the tunnel between the second access switch 62(2) and the MTE 32(2) in the second IP-domain and in the tunnel from the MTE 32(2) to the guest controller 72(1).

Thus, FIG. 11 illustrates the scenario where a guest station roams from a first access switch in a first mobility sub-domain to a second access switch in a second mobility sub-domain. To summarize the flow of FIG. 11, the MC in the second mobility sub-domain receives a Mobile Announce message from the second access switch in the second mobility sub-domain, where the Mobile Announce message indicates that the guest station has roamed to and associated with the second access switch in the second mobility sub-domain. The MC in the second mobility sub-domain receives a Handoff Complete message from the second access switch in the second mobility sub-domain, where the Handoff Complete message contains information for the IP address of the guest controller that is serving the guest station for guest access to the network. The MC in the second mobility sub-domain generates a command to cause the MTE in the second mobility sub-domain to establish a tunnel with the guest controller whose IP address is contained in the Handoff Complete message. The MC in the second mobility sub-domain sends the Handoff Complete message to the mobility oracle (main controller) for the mobility domain, to the MC in the first mobility sub-domain and to the guest controller, thereby causing the guest controller to point tunneling of traffic for the guest station to the MTE in the second mobility sub-domain. Traffic for the guest station is thereafter sent in a tunnel between the second access switch and the MTE in the second mobility sub-domain such that traffic for the guest station passes in the tunnel between the second access switch and the MTE in the second mobility sub-domain, through the MTE in the second mobility sub-domain and in the tunnel between the MTE in the second mobility sub-domain and the guest controller.

The guest access support techniques described herein does not require configuring of guest VLANs on the switch. Traffic from the wired and wireless clients terminates on the access switch. Since the guest VLAN is not present on the access switch, the traffic is tunneled to the MTE over the existing mobility tunnel, and then via a guest tunnel to the guest controller in the DMZ.

Again, the advantage of this approach is that all guest traffic passes through the MTE before being tunneled to the guest controller in the DMZ. This aggregation of guest traffic at the MTE results in a more scalable solution, because fewer tunnels need to be created at the guest controller. The guest controller only needs to support tunnels between itself and all the MTEs in the system. If encryption is desired on the guest traffic, then both the access switch-to-MTE tunnel and the MTE-to-guest controller tunnel need to be encrypted. This innovation handles both wired and wireless guest traffic in a very similar manner. Guest traffic, both wired and wireless, is tunneled to the guest controller in the DMZ by first tunneling from the switch to the MTE and then from the MTE to the guest controller. The same solution supports wired and wireless guest traffic. There is no need to two completely different solutions for wired and wireless guest traffic. Moreover, the tunneling based approach requires minimal configuration on the switches in the access and distribution, thus removing the complex configuration requirements for deploying wired guest solutions.

Accordingly, an apparatus (mobility controller) is provided that comprises a network interface unit configured to enable communications over a network, and a processor configured to be coupled to the network interface. The processor is configured to receive from a first access switch in a first mobility sub-domain a request message containing a request for guest network access for a device, wherein the first mobility sub-domain is one of a plurality of mobility sub-domains in the network; forward the request message to a guest controller that is configured to support guest network access for devices that are not authorized for native access to the network; receiving a response message from the guest controller, the response message containing information to enable guest access for the device; generate a command for a tunneling endpoint apparatus in the first mobility sub-domain to establish a tunnel to the guest controller, over which tunnel all traffic from the device is to be sent to the guest controller such that traffic for the device passes in a tunnel between the first access switch and the tunneling endpoint apparatus in the first mobility sub-domain, through the tunneling endpoint apparatus in the first mobility sub-domain and in the tunnel between the tunneling endpoint apparatus in the first mobility sub-domain and the guest controller.

Each MC is configured to handle an in-bound roam of a guest station to its mobility sub-domain. For example, the MC 30(1) in the first mobility sub-domain (or in general the MC in any mobility sub-domain) is configured to receive from an access switch in the first mobility sub-domain a Mobile Announce message that a guest station has roamed to and associated with an access switch in the first mobility sub-domain from another mobility sub-domain. The MC 30(1) receives a Handoff Complete message from the access switch to which the guest station from the other mobility sub-domain has associated. The Handoff Complete message contains information for the IP address of a guest controller that serves the guest station from the other mobility sub-domain for guest access to the network. The MC in the first mobility sub-domain generates a command to configure the MTE in the first mobility sub-domain to establish a tunnel to the guest controller whose IP address is contained in the Handoff Complete message so that traffic for the device from the other mobility sub-domain is sent in a tunnel between the access switch and the MTE in the first mobility sub-domain, through the MTE in the first mobility sub-domain and in the tunnel between the MTE in the first mobility sub-domain and the guest controller that is identified in the Handoff Complete message.

When the MC and MTE are integrated into a single unit, the tunnel to the guest controller is established by configuring a switching unit (e.g., switch and router 47 shown in FIG. 4) in the single integrated unit to direct traffic for the device in the tunnel to the guest controller.

Further still a system is provided comprising a plurality of access switches in each of a plurality of mobility sub-domains of a network, and each access switch configured to associate with a device for connectivity over the network; and an MC (controller apparatus) in each of the plurality of mobility sub-domains and configured to communicate with the access switches in its respective mobility sub-domain and with the controller apparatus in each of the other mobility sub-domains; a tunneling endpoint apparatus in each of the plurality of mobility sub-domains that is configured to communicate with the controller apparatus in its respective mobility sub-domain and to forward and receive traffic over pre-established tunnels with the access switches in its respective mobility sub-domain. The controller apparatus in any given mobility sub-domain, e.g., the first mobility sub-domain, is configured to receive from a first access switch in the first mobility sub-domain a request message containing a request for guest access to the network for a device; forward the request message to a guest controller that is configured to support guest access for devices that are not authorized for native access to the network; receive a response message from the guest controller, the response message containing information to enable guest access for the device; and configure the tunneling endpoint apparatus in the first mobility sub-domain to cause the tunneling endpoint apparatus to establish a tunnel to the guest controller in which traffic from the device is to be sent to the guest controller. The tunneling endpoint apparatus is configured to forward traffic for the device in the tunnel between the first access switch in the first mobility sub-domain where the device is attached and in the tunnel between the tunneling endpoint apparatus and the guest controller. The controller apparatus is configured to receive from a second access switch in the first mobility sub-domain a handoff complete message indicating that the device has roamed from the first access switch to the second access switch, and to configure the tunneling endpoint apparatus in the first mobility sub-domain to tunnel traffic for the device to the second access switch. Furthermore, the controller apparatus is configured to receive from an access switch in the first mobility sub-domain a mobile announce message indicating that a device from another mobility sub-domain has roamed to and associated with the access switch in the first sub-domain; receive a handoff complete message from the access switch to which the device from the other mobility sub-domain has associated, the handoff complete message containing information for the IP address of a guest controller that is serving the device from the other mobility sub-domain for guest access to the network; generate a command to configure the tunneling endpoint apparatus in the first mobility sub-domain to establish a tunnel to the guest controller whose IP address is contained in the handoff complete message so that traffic for the device from the other mobility sub-domain is sent in a tunnel between the access switch and the tunneling endpoint apparatus in the first mobility sub-domain such that traffic for the other device passes in the tunnel between the access switch and the tunneling endpoint apparatus in the first mobility sub-domain, through the tunneling endpoint apparatus in the first mobility sub-domain and in the tunnel between the tunneling endpoint apparatus in the first mobility sub-domain and the guest controller that is identified in the handoff complete message.

Further still, a processor or computer readable medium encoded with instructions that, when executed by a processor, cause the processor to: at a controller apparatus in a first mobility sub-domain of a network comprising a plurality of mobility sub-domains, receive from a first access switch in the first mobility sub-domain a request message containing a request for guest network access for a device; forward the request message to a guest controller that is configured to support guest network access for devices that are not authorized for native access to the network; receive a response message from the guest controller, the response message containing context information for the device to enable guest access for the device; and generate a command to configure a tunneling endpoint apparatus in the first mobility sub-domain to establish a tunnel to the guest controller in which traffic from the device is sent to the guest controller so that traffic for the device is sent in a tunnel between the first access switch and the tunneling endpoint apparatus, through the tunneling endpoint apparatus in the first mobility sub-domain and in the tunnel between the tunneling endpoint apparatus in the first mobility sub-domain and the guest controller. Additional instructions are provided that, when executed by the processor, cause the processor to receive from a second access switch in the first mobility sub-domain a handoff complete message indicating that the device has roamed from the first access switch to the second access switch, and generate a command to configure the tunneling endpoint apparatus to tunnel traffic for the device from the tunneling endpoint apparatus to the second access switch. Further, additional instructions are provided that, when executed by the processor, cause the processor to receive from an access switch in the first mobility sub-domain a mobile announce message indicating that the device from another mobility sub-domain has roamed to and associated with the access switch in the first mobility sub-domain; receive a handoff complete message from the access switch to which the device from the other mobility sub-domain has associated, the handoff complete message containing information for the IP address of a guest controller that is serving the device for guest access to the network; generate a command that causes the tunneling endpoint apparatus in the first mobility sub-domain to establish a tunnel to the guest controller whose IP address is contained in the handoff complete message so that traffic for the device is sent over a tunnel between the access switch and the tunneling endpoint apparatus in the first mobility sub-domain, through the tunneling endpoint apparatus in the first mobility sub-domain and in the tunnel between the tunneling endpoint apparatus in the first mobility sub-domain and the guest controller that is identified in the handoff complete message.

The above description is by way of example only.

What is claimed is:

1. A method comprising:
receiving, at a controller apparatus in a first mobility sub-domain of a network comprising a plurality of mobility sub-domains, from a first access switch in the first mobility sub-domain a request message containing a request for guest network access for a device;
forwarding, at the controller apparatus, the request message to a guest controller that is configured to support guest network access for devices that are not authorized for native access to the network;
receiving, at the controller apparatus, a response message from the guest controller, the response message containing information to enable guest access for the device; and
establishing, at a tunneling endpoint apparatus in the first mobility sub-domain, a tunnel to the guest controller so that traffic for the device travels in a tunnel between the first access switch and the tunneling endpoint apparatus, through the tunneling endpoint apparatus in the first mobility sub-domain and in the tunnel between the tunneling endpoint apparatus in the first mobility sub-domain and the guest controller.

2. The method of claim 1, wherein receiving the request message comprises receiving a list of guest controllers, and further comprising at the controller apparatus, selecting one of the guest controllers from the list for use in guest support services for the device.

3. The method of claim 2, wherein selecting comprises selecting one of the guest controllers based on relative load conditions of the guest controllers in the list.

4. The method of claim 1, and further comprising receiving a handoff complete message from the first access switch and forwarding the handoff complete message to the guest controller.

5. The method of claim 1, and further comprising receiving from a second access switch in the first mobility sub-domain a handoff complete message indicating that the device has roamed from the first access switch to the second access switch, and tunneling traffic for the device from the tunneling endpoint apparatus to the second access switch.

6. The method of claim 1, and further comprising:
receiving at a controller apparatus in a second mobility sub-domain from a second access switch in the second mobility sub-domain a mobile announce message indicating that the device has roamed to and associated with the second access switch in the second mobility sub-domain;
receiving at the controller apparatus in the second mobility sub-domain a handoff complete message from the second access switch in the second mobility sub-domain, the handoff complete message containing information for the IP address of the guest controller that is serving the device for guest access to the network;
establishing a tunnel between a tunneling endpoint apparatus in the second mobility sub-domain and the guest controller; and
sending the handoff complete message from the controller apparatus in the second mobility sub-domain to a main controller apparatus for the plurality of mobility sub-domains, to the controller apparatus in the first mobility sub-domain and to the guest controller to cause the guest controller to direct tunneling of traffic for the device to the tunneling endpoint apparatus in the second mobility sub-domain.

7. The method of claim 6, and further comprising sending traffic for the device in a tunnel between the second access switch and the tunneling endpoint apparatus in the second mobility sub-domain such that traffic for the device passes in the tunnel between the second access switch and the tunneling endpoint apparatus in the second mobility sub-domain, through the tunneling endpoint apparatus in the second mobility sub-domain and in the tunnel between the tunneling endpoint apparatus in the second mobility sub-domain and the guest controller.

8. The method of claim 1, wherein the controller apparatus and the tunneling endpoint apparatus for the first mobility sub-domain are integrated in a single unit, and wherein establishing the tunnel to the guest controller comprises configuring a switching unit in the single unit to direct traffic for the device in the tunnel to the guest controller.

9. An apparatus comprising:
a network interface unit configured to enable communications over a network;
a processor configured to be coupled to the network interface unit, wherein the processor is configured to:
receive from a first access switch in a first mobility sub-domain a request message containing a request for guest network access for a device, wherein the first mobility sub-domain is one of a plurality of mobility sub-domains in the network;
forward the request message to a guest controller that is configured to support guest network access for devices that are not authorized for native access to the network;
receiving a response message from the guest controller, the response message containing information to enable guest access for the device;
configure a tunneling endpoint apparatus in the first mobility sub-domain to establish a tunnel to the guest controller, over which tunnel traffic from the device is to be sent to the guest controller such that traffic for the device passes in a tunnel between the first access switch and the tunneling endpoint apparatus in the first mobility sub-domain, through the tunneling endpoint apparatus in the first mobility sub-domain and in the tunnel between the tunneling endpoint apparatus in the first mobility sub-domain and the guest controller.

10. The apparatus of claim 9, wherein the processor is further configured to obtain from the request message a list of guest controllers, and to select one of the guest controllers from the list for use in guest support services for the device.

11. The apparatus of claim 9, wherein the processor is further configured to receive from an access switch in the first mobility sub-domain a mobile announce message indicating that a device has roamed to and associated with the access switch in the first mobility sub-domain from another mobility sub-domain; receive a handoff complete message from the access switch to which the device from the other mobility sub-domain has associated, the handoff complete message containing information for the IP address of a guest controller that serves the device from the other mobility sub-domain for guest access to the network; generate a command to configure the tunneling endpoint apparatus in the first mobility sub-domain to establish a tunnel to the guest controller whose IP address is contained in the handoff complete message so that traffic for the other device from the other mobility sub-domain passes in the tunnel between the access switch and the tunneling endpoint apparatus in the first mobility sub-domain, through the tunneling endpoint apparatus in the first mobility sub-domain and in the tunnel between the tunneling endpoint apparatus in the first mobility sub-domain and the guest controller that is identified in the handoff complete message.

12. The apparatus of claim 9, and further comprising the tunneling endpoint apparatus integrated therein and which comprises a switching unit, and wherein the processor configures the tunneling endpoint apparatus by configuring the switching unit to direct traffic for the device in the tunnel to the guest controller.

13. A system comprising:
a plurality of access switches in each of a plurality of mobility sub-domains of a network, each access switch configured to associate with a device for connectivity over the network; and
a controller apparatus in each of the plurality of mobility sub-domains and configured to communicate with the access switches in its respective mobility sub-domain and with the controller apparatus in each of the other mobility sub-domains; and
a tunneling endpoint apparatus in each of the plurality of mobility sub-domains that is configured to communicate with the controller apparatus in its respective mobility sub-domain and to forward and receive traffic over pre-established tunnels with the access switches in its respective mobility sub-domain;
wherein the controller apparatus in a first mobility sub-domain is configured to:
receive from a first access switch in the first mobility sub-domain a request message containing a request for guest access to the network for a device;
forward the request message to a guest controller that is configured to support access for devices that are not authorized for native access to the network;
receive a response message from the guest controller, the response message containing information to enable guest access for the device; and
configure the tunneling endpoint apparatus in the first mobility sub-domain to cause the tunneling endpoint apparatus to establish a tunnel to the guest controller in which traffic from the device is to be sent to the guest controller.

14. The system of claim 13, wherein the tunneling endpoint apparatus is configured to forward traffic for the device in the tunnel between the first access switch in the first mobility sub-domain where the device is associated and in the tunnel between the tunneling endpoint apparatus and the guest controller.

15. The system of claim 14, wherein the controller apparatus is configured to receive a list of guest controllers contained in the request message and to select one of the guest controllers from the list for use in guest support services for the device.

16. The system of claim 13, wherein the controller apparatus is configured to receive from a second access switch in the first mobility sub-domain a handoff complete message indicating that the device has roamed from the first access switch to the second access switch, and to configure the tunneling endpoint apparatus in the first mobility sub-domain to tunnel traffic for the device to the second access switch.

17. The system of claim 13, wherein the controller apparatus is configured to receive from an access switch in the first mobility sub-domain a mobile announce message indicating that a device from another mobility sub-domain has roamed to and associated with the access switch in the first sub-domain; receive a handoff complete message from the access switch to which the device from the other mobility sub-domain has associated, the handoff complete message containing information for the IP address of a guest controller that is serving the device from the other mobility sub-domain for guest access to the network; generate a command to configure the tunneling endpoint apparatus in the first mobility sub-domain to establish a tunnel to the guest controller whose IP address is contained in the handoff complete message so that traffic for the device passes in the tunnel between the access switch and the tunneling endpoint apparatus in the first mobility sub-domain, through the tunneling endpoint apparatus in the first mobility sub-domain and in the tunnel between the tunneling endpoint apparatus in the first mobility sub-domain and the guest controller that is identified in the handoff complete message.

18. A non-transitory computer readable medium encoded with instructions that, when executed by a processor, cause the processor to:
   receive, at a controller apparatus in a first mobility sub-domain of a network comprising a plurality of mobility sub-domains, from a first access switch in the first mobility sub-domain a request message containing a request for guest network access for a device;
   forward the request message to a guest controller that is configured to support network access for devices that are not authorized for native access to the network;
   receive a response message from the guest controller, the response message containing context information for the device to enable guest access for the device; and
   generate a command to configure a tunneling endpoint apparatus in the first mobility sub-domain to establish a tunnel to the guest controller in which traffic from the device is sent to the guest controller so that traffic for the device is sent in a tunnel between the first access switch and the tunneling endpoint apparatus, through the tunneling endpoint apparatus in the first mobility sub-domain and in the tunnel between the tunneling endpoint apparatus in the first mobility sub-domain and the guest controller.

19. The non-transitory computer readable medium of claim 18, and further comprising instructions that, when executed by the processor, cause the processor to receive in the request message a list of guest controllers, and to select one of the guest controllers from the list for use in guest support services for the device.

20. The non-transitory computer readable medium of claim 18, and further comprising instructions that, when executed by the processor, cause the processor to receive from a second access switch in the first mobility sub-domain a handoff complete message indicating that the device has roamed from the first access switch to the second access switch, and generate a command to configure the tunneling endpoint apparatus to tunnel traffic for the device from the tunneling endpoint apparatus to the second access switch.

21. The non-transitory computer readable medium of claim 18, and further comprising instructions that, when executed by the processor, cause the processor to:
   receive from an access switch in the first mobility sub-domain a mobile announce message indicating that device from another mobility sub-domain has roamed to and associated with the access switch in the first mobility sub-domain;
   receive a handoff complete message from the access switch to which the device from the other mobility sub-domain has associated, the handoff complete message containing information for the IP address of a guest controller that is serving the device for guest access to the network; and
   generate a command that causes the tunneling endpoint apparatus in the first mobility sub-domain to establish a tunnel to the guest controller whose IP address is contained in the handoff complete message so that traffic for the device is sent in a tunnel between the access switch and the tunneling endpoint apparatus in the first mobility sub-domain, through the tunneling endpoint apparatus in the first mobility sub-domain and in the tunnel between the tunneling endpoint apparatus in the first mobility sub-domain and the guest controller that is identified in the handoff complete message.

* * * * *